United States Patent [19]

Epple et al.

[11] Patent Number: 5,770,667
[45] Date of Patent: Jun. 23, 1998

[54] FUNCTIONAL COPOLYMERS OF LOW MOLAR MASS, PROCESSES FOR THEIR PREPARATION, AND THEIR USE

[75] Inventors: Ulrich Epple; Annegret Bittner, both of Wiesbaden, Germany

[73] Assignee: Hoechst Aktiengesellschaft, Frankfurt am Main, Germany

[21] Appl. No.: 564,800

[22] Filed: Nov. 29, 1995

[30] Foreign Application Priority Data

Dec. 1, 1994 [DE] Germany ............... 44 42 769.7

[51] Int. Cl.⁶ .................. C08F 2/00; C08F 14/00; C08F 20/54; C08F 56/36; C08F 20/10; C08F 18/04

[52] U.S. Cl. .............. 526/213; 526/318.4; 526/303.1; 526/291; 526/316; 526/332; 526/319; 526/341

[58] Field of Search .................. 526/213, 291, 526/303.1, 316, 318.4, 319, 332, 341

[56] References Cited

U.S. PATENT DOCUMENTS

| | | | |
|---|---|---|---|
| 4,145,513 | 3/1979 | Dalibor | 528/75 |
| 4,350,809 | 9/1982 | Fischer et al. | 528/361 |
| 4,710,556 | 12/1987 | Plum | 526/273 |
| 4,916,254 | 4/1990 | Watanabe et al. | 560/185 |
| 5,068,288 | 11/1991 | Taljan et al. | 525/155 |
| 5,153,257 | 10/1992 | Dalibor | 524/548 |
| 5,422,421 | 6/1995 | Hovestadt et al. | 528/355 |
| 5,446,099 | 8/1995 | Yoshida et al. | 525/204 |

FOREIGN PATENT DOCUMENTS

| | | |
|---|---|---|
| 20 48 444 | 2/1992 | Canada . |
| 2128657 | 2/1995 | Canada . |
| 0 398 387 | 11/1990 | European Pat. Off. . |
| 0 408 858 | 1/1991 | European Pat. Off. . |
| 28 51 616 | 6/1980 | Germany . |
| 40 01 580 | 7/1991 | Germany . |
| 43 26 656 | 2/1995 | Germany . |
| 44 15 319 | 11/1995 | Germany . |
| 43 24 801 | 1/1996 | Germany . |
| 2 037 301 | 3/1983 | United Kingdom . |
| 2 039 498 | 4/1983 | United Kingdom . |
| 90 03991 | 4/1990 | WIPO . |

Primary Examiner—Joseph L. Schofer
Assistant Examiner—W. C. Cheng
Attorney, Agent, or Firm—Foley & Lardner

[57] ABSTRACT

Processes for the preparation of a functional polymer of low molar mass, which includes initially charging a first quantity M1 of a mixture including at least one component selected from olefinically unsaturated monomers B and compounds A which are not themselves copolymerizable but which are able to react with at least one of the monomers B to form a copolymerizable addition compound, metering in prior to or during polymerization a second quantity M2 of a mixture whose composition can be identical to or different from that of the first mixture M1 and which includes at least one component selected from olefinically unsaturated monomers B and compounds A, initiating polymerization by use of a polymerization initiator and optionally a chain transfer agent, conducting polymerization in the presence of an oligomer or polymer C, wherein the oligomer or polymer C is either formed in situ from one or more of A and B or is dissolved in at least one of the quantities M1 and M2, wherein at least one of M1 and M2 includes a monomer B. The polymers are useful in coating compositions.

29 Claims, No Drawings

FUNCTIONAL COPOLYMERS OF LOW MOLAR MASS, PROCESSES FOR THEIR PREPARATION, AND THEIR USE

BACKGROUND OF THE INVENTION

1. Field of the Invention

The present invention relates to functional copolymers of low molar mass, processes for their preparation, and method of their use.

2. Description of Related Art

Functional copolymers of low molar mass can be prepared by free-radical solution polymerization (see EP-A 0 408 858, EP-A 0 398 387, U.S. Pat. No. 4,145,513, DE-A 40 01 580, DE-A 41 00 430, DE-A 28 51 614, DE-A 28 51 615, DE-A 28 51 616). The high quantities of polymerization initiators and regulators which are required during preparation, and their follow-on products, some of which are not incorporated into the polymer chains, have an adverse effect on the properties of the polymers and also on their use as quick-drying coating compositions. In addition, the polymerization regulators used, such as thiols, may have a foul odor or may even be toxic.

The polymers obtained by means of free-radical solution polymerization at a high temperature in high-boiling solvents, although possessing the very low molar masses desired, no longer permit the use of any diluent. This disadvantage is evident in the fact that the resulting coatings can have very long dust and tack-free drying times, which in some cases are due solely to the solvents.

On the other hand, pure mass polymerizations are possible, in which only monomers, polymers, and initiators are present. However, the liberation of very large quantities of heat in a short reaction time makes such a polymerization almost impossible to control.

In contrast, polymerization in bulk, in which one or more low molar mass components are taken as initial charge and reacted at elevated temperature with other components in a free-radical polymerization, provides the main advantage of efficient and rapid dissipation of the heat of reaction. Bulk polymers formed in this way are solvent-free products which can be present either as solid resins or dissolved in selectable, usually low-boiling solvents. An additional advantage is that the degree of dilution (solids content) can be varied. Polymerization reactions of this kind are described in EP-A 0 027 931, EP-A 0 056 971, DE-P 43 24 801, DE-P-43 26 656, DE-P 44 15 319 and DE-P 44 35 950. The initial charge in this case of glycidyl ester or maleate, acts initially as solvent and is incorporated completely into the copolymer during the reaction, so that unreacted, disruptive constituents are no longer present in the end product.

Examples are likewise known in which cyclic or ring-form components such as lactones or lactams, alone or in combination with polyhydric alcohols, are taken as initial charge (see WO 90/03991, EP-A 0 580 054).

The starting materials of these processes are chosen so that the reflux of the elimination products from the initiators and low-boiling monomers can be controlled even at the high polymerization temperatures. This constitutes a restriction when using low-boiling monomers such as methyl methacrylate, for example.

Copolymers having high contents of methyl methacrylate with correspondingly reduced contents of aromatic vinyl compounds are desirable since the coating compositions prepared therefrom exhibit increased weather resistance and a decreased tendency toward yellowing.

SUMMARY OF THE INVENTION

An object of the present invention was, therefore, to use the advantageous bulk polymerization process to prepare novel, functional copolymers of low molar mass which also permit high contents of low-boiling monomers, such as methyl methacrylate, in the polymerization process.

It has surprisingly been found that the addition of macromonomers, namely reactive oligomers or polymers, increases the rate of incorporation of the low-boiling monomers and, therefore, provides ready access to polymers which contain these low-boiling monomers in high proportions.

The invention relates, therefore, to a process for the preparation of functional polymers of low molar mass which comprises initially charging prior to polymerization, a first quantity M1 of a mixture comprising at least one component selected from olefinically unsaturated monomers B and compounds A, which are not themselves copolymerizable but which are able to react with at least one of the monomers B to form a copolymerizable addition compound, then initiating the polymerization by adding polymerization initiators and, if desired, chain transfer agents, and metering in during polymerization a further quantity M2 of a mixture whose composition can be identical to or different from that of the first mixture and which comprises at least one component selected from olefinically unsaturated monomers B and compounds A, where an oligomer or polymer C is dissolved in at least one of the quantities M1 and M2. The presence of the component C is an essential element of the invention.

The invention also relates to polymers prepared using this process and to uses of the so-prepared polymers, for example, in coating compositions.

Further objects, features, and advantages of the invention will become apparent from the detailed description of preferred embodiments that follows.

DETAILED DESCRIPTION OF THE PREFERRED EMBODIMENTS

Any process falling within the scope outlined above is useful in the present invention. A preferred variant in this context comprises initially charging as M1 merely component A and metering in as M2 a mixture of monomers B with component C, either separately or together with polymerization initiator and, if desired, regulator.

Another preferred variant comprises initially charging a solution of component C in component A as M1 and then metering in as M2 the mixture of the monomers B, with or without adding a further quantity of component C, separately or together with polymerization initiator and, if desired, regulator.

A third preferred variant comprises initially charging a quantity M1 of a mixture of monomers B, component A and component C and then metering in a quantity M2 of a mixture of the monomers B which has a different composition, with or without the addition of a further quantity of component C, separately or together with polymerization initiator and, if desired, regulator. In this variant, lower-boiling monomers are not added until during the polymerization.

A further variant comprises adding one or more compounds A after the polymerization.

An additional variant comprises metering in additional quantities of polymerization initiators and, if desired, regulators during the polymerization.

In a particularly preferred variant of the process of the invention, the initial charge M1 comprises at least one component A selected from maleates, lactones, lactams, monoepoxides (glycidyl components), ketenes, cyclic carbonates and cyclic formals, alone or in combination with polyhydric alcohols; then a mixture of at least one oligomer or polymer C having at least one functional group or polymerizable unit and monomers B is formed in situ or added as M2, some of which compounds have low boiling points; subsequently, a free-radical bulk polymerization is carried out. The parameters of polymerization temperature, nature and quantity of initiator and, if desired, of the regulator can be selected such that the polymerization is controllable, and unreacted, disruptive constituents are no longer present in the end product.

These copolymers according to the invention can be prepared, in particular, by the free-radical reaction of A one or more glycidyl esters of saturated aliphatic monocarboxylic acids having a tertiary or quaternary α carbon atom and B at least two unsaturated copolymerizable monomers, of which at least one contains at least one COOH group, and C at least one oligomer or polymer, which has either at least one functional group or one polymerizable unit.

In particular, products which are advantageous in the context of the invention are obtained by subjecting a mixture of A from 1.0 to 35.0%, preferably from 2 to 30%, of glycidyl esters having from 7 to 30 carbon atoms of aliphatic saturated monocarboxylic acids having a tertiary or quaternary a carbon atom, and B from 98.9 to 40.0%, preferably from 97.5 to 50%, of at least two unsaturated copolymerizable monomers of which at least one contains at least one carboxyl group, and C from 0.1 to 25.0%, preferably from 0.5 to 20%, of at least one oligomer or polymer which contains either at least one functional group or one polymerizable unit, to a free-radical polymerization. In a preferred embodiment, at least component A, the glycidyl ester, is initially charged and reacted at from 80° to 250° C. with B and C and at least one initiator in a bulk polymerization until a degree of reaction of at least 95%, preferably at least 97.5%, has been reached, component B contains at least 0.5% of a COOH-containing monomer, and component C is at least one oligomer or polymer which is incorporated into the resulting copolymer.

A preferred embodiment comprises taking as initial charge a mixture of component A and component C, then metering in the monomers B, together or separately, with polymerization initiators. In a further preferred embodiment, component C is formed in situ from a component A and further low-molar mass compounds or monomers before the major quantity of monomer and the initiators are metered in. Examples of this procedure are the use of epoxy compounds as component A and the addition of dicarboxylic acids, the opening of the epoxide ring leading to the formation of a polyester; or the use of lactones or dicarboxylic anhydrides in combination with dihydric or polyhydric alcohols or hydroxy-functional monomers. Therefore, in this procedure, component C is preferably formed by polyaddition of an at least difunctional compound of low molar mass onto a part or constituent of component A and/or B.

The invention additionally relates to novel functional copolymers of low molar mass which are obtainable by this process. The invention also relates, moreover, to the use of these polymers, especially as coating compositions and, in particular, as high-solids coating compositions.

The invention relates in particular to hydroxyl-containing acrylate copolymers, preferably those having an OH number from 40 to 250 mg/g, a low solution viscosity of from 15 to 2000 mPa s (50% strength, 23° C.), a weight-average molar mass ($M_w$) of from 300 to 10,000 g/mol, preferably of from 500 to 9,000 g/mol, and particularly preferably of from 1,000 to 8,000 g/mol, and a high proportion of methyl methacrylate. The proportion of methyl methacrylate in the copolymers of the invention is generally from 15% to 90%, preferably from 20% to 80%, and, with particular preference, from 25% to 75%. Using the process described here, such copolymers are rendered accessible for the first time. All portions given in %, here and below, are proportions and contents by mass unless expressly stated otherwise.

Any desired compounds (A) are useful. Compounds suitable as component A are those which undergo addition or polyaddition reaction with carboxyl-containing monomers and/or with hydroxyl-containing monomers (B) to give esters and amides, for example. Examples of such compounds (A) are structures which contain an epoxy group, a lactone or lactam ring or a cyclic carbonate, acetal or anhydride group.

Preference is given to lactones and epoxy compounds especially glycidyl esters of aliphatic monocarboxylic acids which are branched in the a position with respect to the carboxyl group.

The reaction between the carboxyl groups of (B) and the epoxide groups of (A) may take place with or without catalysis. Any desired catalysts can be used. Particularly suitable catalysts include alkali metal compounds, alkaline earth metal compounds, and transition metal compounds, such as compounds of Na, Li, K, V, Zr and Ti, for example.

As component A it is particularly preferred to employ glycidyl esters of α-alkylalkanemonocarboxylic acids and/or α,α-dialkylalkanemonocarboxylic acids, individually or in a mixture. The glycidyl esters generally have from 7 to 30, preferably from 8 to 25, carbon atoms.

In the initial monomer mixture component A consists preferably of a glycidyl ester of an α,α-dialkylalkane-monocarboxylic acid, for example, the glycidyl ester of Versatic 10 or 5 acid.

The carboxyl-containing monomers of (B) which are preferably used, are preferably available in sufficient quantity for the reaction with component A to take place completely, resulting in an acid number of at least 1 mg/g in the product prepared.

Any olefinically unsaturated monomer may be used as component B. Component B is generally a mixture of at least two olefinically unsaturated copolymerizable monomers of which at least one (B1) contains a carboxyl group.

Suitable olefinically unsaturated, acidic monomers in accordance with B1 are unsaturated monocarboxylic acids having up to 22 carbon atoms and monoesters of olefinically unsaturated dicarboxylic acids having up to 22 carbon atoms. Examples include acrylic and methacrylic acid, maleic, fumaric and itaconic monoesters, maleic, fumaric and itaconic acid and crotonic, isocrotonic and vinylacetic acid, and unsaturated fatty acids of 8 to 22 carbon atoms, such as linolenic acid, linoleic acid, oleic acid, arachidonic acid and ricinene fatty acid.

To catalyze the carboxy-epoxy reaction of α,β-olefinic carboxylic acids (B1) and monoepoxides useful as compound (A), it is useful to employ customary compounds such as, for example, carbonates, bicarbonates, formates, iodides, bromides, fluorides and hydroxides of alkali metals, such as sodium, lithium, potassium, rubidium and cesium compounds, alone or as a mixture. The use of lithium hydroxide and potassium hydroxide—alone or as a mixture—has been found particularly appropriate.

Advantageously the alkali metal hydroxide employed or the alkali metal compound or mixture thereof is dissolved in the acid to be esterified. It is also possible, however, first to prepare the alkali metal salt of the acid from the acid and the alkali metal compound, for example, the alkali metal hydroxides, alkali metal carbonates or alkali metal bicarbonates, as the catalyst and then to dissolve the alkali metal salt of the acid in the reaction mixture or cause it to dissolve by heating in the course of the addition reaction.

The catalysts are used in amounts effective to catalyze the reaction. It is sufficient in general to add from about 0.005% to about 0.5% of alkali metal compound of the type specified above, based on the weight of the ester-forming components, for the addition reaction.

Further constituents useful in component B include

B2 esters of aliphatic alcohols and α,β-olefinically unsaturated carboxylic acids, B3 esters of aliphatic diols or polyols having n-hydroxyl groups per molecule and from 1 to n−1 mol/mol of α,β-olefinically unsaturated carboxylic acids, n being at least 2, B4 amides, N-substituted amides and nitriles of α,β-olefinically unsaturated carboxylic acids, B5 vinyl compounds selected from vinyl esters of aliphatic monocarboxylic acids having 1 to 20 carbon atoms, vinyl ketones, vinyl halides, aromatic vinyl compounds and vinylidene halides, in which context it is preferred for at least one compound from each of groups B1 and B2 to be present in each case, while compounds from groups B3, B4 and B5 can optionally be present.

Particularly suitable compounds of group B2 are esters of aliphatic alcohols having preferably from 1 to 30 carbon atoms and α,β-olefinically unsaturated carboxylic acids having preferably from 3 to 22 carbon atoms, examples being acrylates and methacrylates of monohydric alcohols having 1 to 30 carbon atoms.

Examples of particularly suitable compounds B2 include the alkyl esters, for example, the methyl, ethyl, propyl, 2-ethylhexyl, butyl, isobutyl, tert-butyl, hexyl, cyclohexyl, nonyl, lauryl, stearyl, 3,3,5-trimethylcyclohexyl, 4-tert-butylcyclohexyl and isobornyl (including the structural isomers thereof) esters of acrylic and methacrylic acid.

Both here and in the components mentioned below, the term "α,β-unsaturated carboxylic acids" includes the dicarboxylic acids, such as maleic acid, fumaric acid and itaconic acid, and also their monoesters.

Additional constituents of component B2 may be halogenated esters such as, for example, trifluoroethyl, pentafluoro-n-propyl and hexachlorobicycloheptenyl acrylate or methacrylate, methyl 2-fluoroacrylate or dibromophenyl 2-fluoroacrylate.

As component B2, it is also useful to employ glycidyl esters of acrylic or methacrylic acid, preferably glycidyl acrylate and glycidyl methacrylate, and also diglycidyl maleate or diglycidyl fumarate, as well as monomers containing silane groups. Typical examples of these monomers include acrylatoalkoxysilanes, such as γ-(meth)acryloyloxypropyltrimethoxysilane, γ-(meth)acryloyloxypropyltris(2-methoxyethoxy)silane and vinylalkoxysilanes, such as vinyltrimethoxysilane, vinyltriethoxysilane and vinyltris(2-methoxyethoxy)silane. Corresponding acyloxysilanes are also included here.

Particularly preferred as B2 are lower alkyl esters (with from 1 to 4 carbon atoms in the alkyl radical) of acrylic or methacrylic acid, in particular methyl methacrylate.

The compounds B3 are preferably esters of α,β-unsaturated monocarboxylic acids with aliphatic polyols or diols having 2 to 30, especially 2 to 20, carbon atoms in the alkylene radical, in which at least one hydroxyl group of the polyol or diol remains unesterified. This is achieved by esterifying a polyol having n-hydroxyl groups with from 1 to n−1 mol of an α,β-olefinically unsaturated carboxylic acid. Monoesters having a primary hydroxyl group are preferred, for example, hydroxyethyl acrylate, hydroxypropyl acrylate, hydroxybutyl acrylate, hydroxyamyl acrylate, neopentylglycol monoacrylate, hydroxyhexyl acrylate, hydroxyoctyl acrylate and the corresponding methacrylates. Examples of hydroxyalkyl esters having a secondary hydroxyl group which may be used are 2-hydroxypropyl acrylate, 2-hydroxybutyl acrylate, 3-hydroxybutyl acrylate and the corresponding methacrylates.

It is also possible to employ as B3 in each case the corresponding esters of other α,β-unsaturated carboxylic acids, such as those of crotonic acid, isocrotonic acid and vinylacetic acid. Further suitable compounds are monoesters of α,β-unsaturated monocarboxylic acids with cycloaliphatic diols such as 1,4-cyclohexanedimethanol, 3(4),8(9)-bis(hydroxymethyl)tricyclo[5.2.1.0$^{2,6}$] decane or dihydroxy aromatic compounds, such as pyrocatechol, hydroquinone and bisphenol A. Also suitable are monoesters of aliphatic and aromatic polyols, such as glycerol mono(meth) acrylate, or mono(meth)acrylates of sorbitol, pentaerythritol or glycosides.

Suitable compounds of the group B4 include amides, N-substituted amides such as N-alkylamides and N,N-dialkylamides, and nitriles of α,β-olefinically unsaturated carboxylic acids preferably having 3 to 22 carbon atoms, especially the derivatives of acrylic and methacrylic acid such as acrylamide, methacrylamide, N,N-methylacrylamide, acrylonitrile and methacrylonitrile.

Suitable compounds of group B5 include vinyl esters of aliphatic, linear or branched monocarboxylic acids, such as vinyl acetate or Versatic acid vinyl esters, and aromatic vinyl compounds such as styrene, α-methylstyrene, vinyltoluenes and vinylnaphthalene. Further suitable compounds are vinyl halides and vinylidene halides, such as vinyl chloride and vinylidene chloride, and also vinyl ketones such as methyl vinyl ketone and ethyl vinyl ketone, and vinyl ethers such as methyl vinyl ether and isobutyl vinyl ether.

One example from the group B5 is styrene as an inexpensive standard monomer. However, it is preferably employed in a limited quantity (up to 45%, preferably up to 35%, in particular up to 30%) or not at all.

In the initial monomer mixture, component B preferably consists of a mixture of

B1 from 1 to 50%, preferably from 3.5 to 40%, of α,β-olefinically unsaturated carboxylic acids, B2 from 5 to 99%, preferably from 5 to 96.5%, of esters of aliphatic alcohols having 1 to 30 carbon atoms and α,β-olefinically unsaturated carboxylic acids, B3 from 0 to 45%, preferably from 1 to 25%, of esters of aliphatic diols or polyols having 2 to 30 carbon atoms and n hydroxyl groups per molecule and from 1 to n−1 mol/mol of α,β-olefinically unsaturated carboxylic acids, n being at least 2, B4 from 0 to 45%, preferably from 1 to 25%, of amides, N-substituted amides and nitriles of α,β-olefinically unsaturated carboxylic acids, and B5 from 0 to 45%, preferably from 1 to 40%, of vinyl compounds selected from vinyl esters of aliphatic monocarboxylic acids having 1 to 20 carbon atoms, vinyl ketones, vinyl ethers, vinyl halides, styrene, vinyltoluene and vinylidene halides, the sum of the proportions by mass always being 100%.

Particularly suitable monomers include

B1 acrylic acid, methacrylic acid, maleic acid, and fumaric acid,

B2 methyl, ethyl, propyl, isopropyl, butyl, t-butyl, 2-ethylhexyl, lauryl, 4-tert.-butylcyclohexyl and isobornyl esters of acrylic and methacrylic acid, glycidyl esters of acrylic or methacrylic acid, or monomers containing silane groups, B3 hydroxyethyl, hydroxypropyl, hydroxybutyl, 2-hydroxypropyl, 2-hydroxybutyl acrylate, and the corresponding methacrylates B4 acrylamide, N-methylacrylamide, N,N-dimethylacrylamide, acrylonitrile, and the corresponding derivatives of methacrylic acid, and B5 aromatic vinyl compounds such as styrene and vinyltoluenes, and Versatic acid vinyl esters.

Component C comprises any desired oligomer or polymer that give the effect of the present invention. Oligomers or polymers based on polyesters, polyamides, polyacrylates, polyolefins and polyethers are preferred. The compounds which constitute component C are preferably selected from C1 polyesters of aliphatic diols and aliphatic dicarboxylic acids, and/or lactones, in which case up to 5% of the carboxylic acids and/or of the diols can be replaced by polycarboxylic acids or, respectively, by polyols having in each case three or more functional groups, and up to 5% of the carboxylic acids can be olefinically unsaturated, C2 polyamides of aliphatic dicarboxylic acids, aliphatic diamines, and/or lactams, in which case up to 5% of the carboxylic acids and/or of the diamines can be replaced by polycarboxylic acids or, respectively, by polyamines having in each case three or more functional groups, and up to 5% of the carboxylic acids can be olefinically unsaturated, C3 polyethers of aliphatic diols which may if desired carry amino end groups, and polyethers which can be formed from glydicyl ethers of aromatic or aliphatic di- and/or polyhydroxy compounds, in which case up to 5% of the hydroxy compounds can be olefinically unsaturated, and C4 polymers which are obtainable by copolymerization of compounds having one olefinic double bond and at least 2%, based on the mass of the monomers, of compounds having at least two olefinic double bonds.

Suitable examples of C include reaction products of acrylic and/or methacrylic acid or hydroxyethyl acrylate and/or hydroxyethyl methacrylate with lactams or lactones. Other suitable compounds are esters of α,β-unsaturated carboxylic acids and the oligomeric alkylene glycols, such as oligoethylene glycol or oligopropylene glycol.

Suitable compounds C may also be formed from the reaction of compounds from group A with third compounds, preferably of low molar mass, having at least two functional groups. Examples of such compounds are reaction products of epoxy compounds, lactones or cyclic carbonates or acetals with dicarboxylic acids; and also reaction products of lactones or cyclic acid anhydrides with di- or polyhydric alcohols or with hydroxy-functional monomers.

The molar masses of the components (C) employed are within the limiting range between oligomers and polymers and generally range from 300 up to 2000 g/mol, in particular from 500 up to 1000 g/mol.

Compound (C) preferably has one or more functional groups. Any desired functional group is useful. The functional groups of the compounds which constitute component C are generally selected from carboxyl, hydroxyl, amino, acid amide, hydrazine and hydrazide groups, glycidyl groups and olefinic double bonds, with preference being given to olefinic double bonds and hydroxyl, amino and carboxyl groups. Olefinic double bonds are understood as including those represented by α,β-unsaturated carboxylic esters.

In the initial monomer mixture, component C preferably includes reaction products of hydroxyethyl acrylate and/or hydroxyethyl methacrylate and at least 2 mol of ε-caprolactone per mole of the hydroxy acrylate. It is also preferred to employ reaction products of polyethylene or polypropylene glycol monoacrylate and/or monomethacrylate with at least 2 molecules of ethylene and/or propylene glycols, which can be either uncapped or capped.

The oligomers or polymers (component C) which have either a functional group or a polymerizable unit should be available in a quantity such that low-boiling components of B and elimination products from the initiator are prevented from evaporating to any significant extent. The controllability of the overall reaction is assured by the use of component C.

Suitable polymerization initiators for preparing the copolymers according to the invention are the customary free-radical-forming compounds, individually or as a mixture. Examples of such compounds include aliphatic azo compounds, diacyl peroxides, peroxydicarbonates, alkyl peresters, alkyl hydroperoxides, perketals, dialkyl peroxides or ketone peroxides. Preference is given to dialkyl peroxides such as di-t-butyl peroxide or di-t-amyl peroxide and to alkyl peresters such as t-butyl peroxy-2-ethylhexanoate or t-amyl peroxy-2-ethylhexanoate. The proportion of initiators can, for example, be from 0.5 to 5%, preferably up to 4% and, in particular, up to 3%, based on the overall mass of the starting components. The initiators can be added together with the monomers or separately from them. During the polymerization it is possible to add further quantities of initiators, if desired as a mixture with regulators.

Regulators which can be used are the customary compounds, for example, alkylmercaptans, and preferably alkylenedithiols such as, for example, 2,3-butanedithiol or 1,5-pentanedithiol. However, it is preferred in accordance with the invention not to employ any regulators.

The polymerization is preferably carried out in bulk (as a mass polymerization at the end of polymerization). The term "bulk polymerization" refers to a polymerization which is generally carried out without solvent. In some cases, however, the presence of a small proportion of solvent, namely up to 20%, preferably up to 10% and, in particular, up to 5%, based on the mass of the starting components, is also possible. In this case it is possible to carry out polymerization under increased pressure. However, working without solvent is preferred.

The processes according to the invention can be carried out batchwise (in a so-called batch process) or continuously. In the multistage processes one option is an embodiment in which the respective reaction stages are carried out in separate vessels. It is likewise possible to carry out the reaction in the first stage continuously and to carry out the reaction in the second stage by a batchwise procedure. In this case, block-type copolymers can also be prepared.

Examples of suitable solvents for diluting the products obtained in accordance with the invention are aliphatic, cycloaliphatic and/or aromatic hydrocarbons, such as alkylbenzenes, for example, xylene or toluene; esters, such as ethyl acetate, butyl acetate, acetates of longer alcohol residues, butyl propionate, pentyl propionate, ethylene glycol monoethyl ether acetate or the corresponding methyl ether acetate; ethers, such as ethylene glycol acetate monoethyl, methyl or butyl ether; glycols; alcohols; ketones, such as methyl amyl ketone or methyl isobutyl ketone; lactones or the like, or mixtures of such solvents. Other solvents which can be employed include reaction products of lactones with glycols or alcohols.

The hydroxyl- and carboxyl-containing copolymers which are usually prepared in the present invention can be further modified in a subsequent stage, for example, by reaction with isocyanate compounds. These isocyanate compounds include, for example, all low molar mass urea derivatives which, in the paint industry, lead to "sag controlled" acrylic resins. For this purpose, the copolymers and monoamines are taken as initial charge and appropriate isocyanates are stirred in.

The copolymers according to the invention are particularly suitable for coatings-related applications in 1-component and 2-component systems, especially for so-called high-solid systems, i.e., for solvent-containing mixtures having a high solids content in excess of 50%.

The present invention furthermore relates to coating compositions which comprise the copolymers which are generally hydroxyl-containing copolymers, according to the invention, as binder component. The copolymers can be cured in the presence of suitable crosslinking agents without heat or at elevated temperature.

Suitable curing components in these coating compositions include amino resins, polyisocyanates and compounds containing anhydride groups, individually or in combination. The curing agent is added in an amount to provide the desired curing to the functional polymer. Preferably, the crosslinking agent is in each case added in a quantity such that the molar ratio of the OH groups or other functional group of the copolymer to the reactive groups of the crosslinking agent is between 0.3:1 and 3:1.

Amino resins which are suitable as the curing component are preferably urea resins, melamine resins and/or benzoguanamine resins. The products involved are etherified urea-, melamine- and benzoguanamine-formaldehyde condensation products. Suitable mixing proportions are generally in the range from 50:50 to 90:10 copolymer/amino resin crosslinking agent, based on solid resin. Suitable phenolic resins and derivatives thereof can also be employed as curing agents. In the presence of acids such as p-toluenesulfonic acid, these crosslinking agents lead to full curing of the coating. Hot curing can be carried out in a conventional manner at temperatures of from 80° to 200° C. in, for example, from 10 to 30 minutes.

Polyisocyanates are also suitable for curing the products according to the invention, accompanied by crosslinking, especially at moderate temperatures and at room temperature. Suitable polyisocyanate components are, in principle, all aliphatic, cycloaliphatic or aromatic polyisocyanates which are known from polyurethane chemistry, alone or in mixtures. Those which are particularly suitable are, for example, low molar mass polyisocyanates such as, for example, hexamethylene diisocyanate, 2,2,4- and/or 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane or mixtures of these isomers with their higher homologs, as are accessible in a manner known per se by phosgenization of aniline-formaldehyde condensation products, and 2,4- and/or 2,6-diisocyanatotoluene or any desired mixtures of such compounds.

It is preferred to employ derivatives of these simple polyisocyanates, as are conventional in coatings technology. These include polyisocyanates which contain, for example, biuret groups, uretdione groups, isocyanurate groups, urethane groups, carbodiimide groups or allophanate groups, as are described, for example, in EP 0 470 461, hereby incorporated by reference.

The particularly preferred modified polyisocyanates include N,N',N"-tris(6-isocyanatohexyl)biuret and its mixtures with its higher homologs, as well as N,N',N"-tris(6-isocyanatohexyl) isocyanurate and its mixtures with its higher homologs containing more than one isocyanurate ring.

The crosslinking reaction can optionally be catalyzed by addition of volatile organic acids, such as formic acid and acetic acid, or organometallic compounds, such as tin compounds and, if desired, tertiary amines, preferably diethylethanolamine. Examples of appropriate tin compounds are dibutyltin dilaurate, dibutyltin diacetate and dibutyloxotin.

Compounds suitable for curing at elevated temperature, in addition, include capped polyisocyanates, polycarboxylic acids and their anhydrides.

The copolymers according to the invention are particularly suitable for the production of high-solids, solvent-containing clear coats. In addition, they are well suited to the production of high-solids, solvent-containing pigmented coating materials.

These high-solids coating compositions are employed in particular in the production-line finishing and refinishing of automobiles, in industrial coating, in the coating of wood and in the coating of textiles, leather, paper and construction materials.

The copolymers according to the invention are also suitable for the production of powder coatings, generally when used in conjunction with polycarboxylic anhydrides. They can also be reacted with polycarboxylic anhydrides, and the products can be employed as curing agents for various synthetic resins, especially epoxy resins. Of particular interest is the use of the products according to the invention together with specific polycarboxylic acid partial esters or derivatives of polycarboxylic acids or their anhydrides or ester anhydrides.

In coating compositions produced using the copolymers according to the invention it is also possible for other auxiliaries and additives, conventional in coating technology, to be present which have not been mentioned hitherto. These include, in particular, catalysts, leveling agents, silicone oils, plasticizers such as phosphates and phthalates, pigments such as iron oxides, lead oxides, lead silicates, titanium dioxide, barium sulfate, zinc sulfide, phthalocyanine complexes, etc., and fillers such as talc, mica, kaolin, chalk, ground quartz, ground asbestos, ground slate, various silicic acids and silicates, viscosity-controlling additives, flatting agents, UV absorbers and light stabilizers, antioxidants and/or peroxide-decomposing additives, antifoams, wetting agents, and active diluents—reactive diluents.

The coating compositions can be applied to any desired substrate by any desired methods, for example, by brushing, dipping, flow coating, or using rollers or blades, but in particular by spraying, electrostatic and tribological application. They can be applied at elevated temperature, and if desired can be brought into an application-ready form by injection of supercritical solvents (e.g., $CO_2$).

The cold curing of the coatings is carried out generally at temperatures in the range from −20° to +100° C., preferably from −10° to +60° C. Hot curing can be undertaken in the customary manner at temperatures of, for example, from 80° to 200° C. in, for example, from 10 to 30 minutes.

The invention is illustrated in more detail in the examples which follow. In the working examples, as in the rest of the text, all percentages are proportions by mass unless indicated otherwise. The examples illustrate the invention but do not limit it.

EXAMPLES

I. Copolymer preparation

Ia.) Preparation of the copolymers with polypropylene glycol monomethacrylate

In a reactor fitted with a stirrer, inert gas inlet, a heating and cooling system and a feed device, the glycidyl ester of an α,α-dialkylalkanemonocarboxylic acid [e.g., glycidyl ester of ®Versatic 10 acid (trade name: Cardura® E 10, Shell Chemicals)] (in some cases with solvent or solvent mixtures) is initially charged and heated under an inert gas to the desired temperature. Subsequently, over a period of 6 hours, the monomer mixture (in some cases with solvents or solvent mixtures) is metered in at a uniform rate, together or separately, with the initiator (in some cases in solvent or solvent mixtures). Polymerization is subsequently carried out for 2 hours until a conversion of at least 95% has been reached.

The copolymers are diluted in suitable solvents or solvent mixtures.

The following copolymers are prepared. The precise batches in terms of parts by weight, reaction conditions and product characteristics can be taken from the tables below.

TABLE 1

Preparation and properties of the copolymers A

| Batch | Comparison | A |
|---|---|---|
| organic compounds | | |
| glycidyl ester | 13.78 | 13.78 |
| acrylic acid | 5.44 | 5.44 |
| hydroxyethyl methacrylate | 10.12 | 10.12 |
| polypropylene glycol monomethacrylate (n = 6) | — | 1.31 |
| n-butyl acrylate | 7.50 | 6.18 |
| methyl methacrylate | 44.48 | 44.48 |
| styrene | 18.68 | 18.68 |
| initiator | di-tert-amyl peroxide 1.50 | di-tert-amyl peroxide 1.50 |
| polymerization temperature (°C.) | 175° C. | 175° C. |
| SC (%) after polymerization | polymerization uncontrolled (reflux too strong) | 98.5 |
| SC (%) sf. (in butyl acetate) | | 69.7 |
| acid number (mg KOH/g SR) | | 12.7 |
| hydroxyl number (mg KOH/g SR) | | 80 |
| viscosity (mPas), 23° C. (sf) | | 3510 |
| viscosity (mPas), 23° C. (50% strength in BuAc) | | 65 |
| GPC (PS calibration) | | |
| Mw (g/mol) | | 4970 |
| Mn (g/mol) | | 1960 |
| U = Mw/Mn | | 2.5 |
| Hazen color number | | 46 |
| appearance | | transparent |

SC: solids content

TABLE 1-continued

Preparation and properties of the copolymers A

| Batch | Comparison | A |
|---|---|---| n: average degree of polymerization of the propylene glycol
SR: solid resin
sf: supply form
GPC: $M_w$, $M_n$ average molar mass (weight average, number average), Millipore ® Waters Chromatography System 860
Pump: Waters Model 590, RI detector: Waters Model 410
Column packing: Waters Ultrastyragel 1 × 1000 Å + 1 × 500 Å + 1 × 100 Å (Ångström)
Solvent: tetrahydrofuran at 40° C.
Flow rate: 1 ml/min, concentration: 1% strength based on solids content
Calibration: polystyrene (from PSS, Mainz)
Determination of characteristics: acid number, hydroxyl number and viscosity (for standards see "Analytische Bestimmungsmethoden" [Analytical determination methods] (brochure: Kunstharze Hoechst AG, 1982 edition))
Hazen color number in accordance with DIN 53 995

Result:

The copolymer A according to the invention can be prepared despite high polymerization temperature and high content of methyl methacrylate. The functional copolymer has low molar masses ($M_w$ less than 10,000 g/mol).

TABLE 2

Preparation and properties of the copolymers B

| Batch | Comparison | B |
|---|---|---|
| organic compounds | | |
| glycidyl ester | 14.00 | 14.00 |
| acrylic acid | 5.53 | 5.53 |
| hydroxyethyl methacrylate | 10.29 | 10.29 |
| polypropylene glycol monomethacrylate (n = 6) | — | 2.66 |
| n-butyl acrylate | 3.45 | 0.79 |
| methyl methacrylate | 66.73 | 66.73 |
| styrene | — | — |
| initiator | di-tert-amyl peroxide 1.50 | di-tert-amyl peroxide 1.50 |
| polymerization temperature (°C.) | 175° C. | 175° C. |
| SC (%) after polymerization | polymerization uncontrolled (reflux too strong) | 98.7 |
| SC (%) sf. (in butyl acetate) | | 69.9 |
| acid number (mg KOH/g SR) | | 13.1 |
| hydroxyl number (mg KOH/g SR) | | 80.5 |
| viscosity (mPas), 23° C. (sf) | | 3360 |
| viscosity (mPas), 23° C. (50% strength in BuAc) | | 63 |
| GPC (PS calibration) | | |
| Mw (g/mol) | | 5040 |
| Mn (g/mol) | | 2100 |
| U = Mw/Mn | | 2.4 |
| Hazen color number | | 37 |
| appearance | | transparent |

SC: solids content
n: average degree of polymerization of the propylene glycol
SR: solid resin
sf: supply form
GPC: $M_w$, $M_n$ average molar mass (weight average, number average), Millipore ® Waters Chromatography System 860
Pump: Waters Model 590, RI detector: Waters Model 410
Column packing: Waters Ultrastyragel 1 × 1000 Å + 1 × 500 Å + 1 × 100 Å (Ångström)
Solvent: tetrahydrofuran at 40° C.
Flow rate: l/min, concentration: 1% strength based on solids content
Calibration: polystyrene (from PSS, Mainz)
Determination of characteristics: acid number, hydroxyl number and viscosity (for standards see "Analytische Bestimmungsmethoden" [Analytical determination methods] (brochure: Kunstharze Hoechst AG, 1982 edition))
Hazen color number in accordance with DIN 53 995

Result:

The copolymer B according to the invention can be prepared despite high polymerization temperature and very high content of methyl methacrylate.

The functional copolymer contains no styrene and has a low molar mass ($M_w$ less than 10,000 g/mol).

Ib.) Preparation of the copolymers with polyesterol monomethacrylate

In a reactor fitted with a stirrer, inert gas inlet, a heating and cooling system and feed devices, the glycidyl ester of an α,α-dialkylalkanemonocarboxylic acid [e.g., glycidyl ester of Versatic® 10 acid (trade name: Cardura® E 10, Shell Chemicals)] and a small quantity of ε-caprolactone with little hydroxyethyl methacrylate (e.g., in solvent or solvent mixtures) is initially charged and is heated under inert gas to the desired temperature.

Subsequently over a period of 6 hours, the monomer mixture (e.g., in some cases with solvent or solvent mixtures) is metered in at a uniform rate, together or separately with the initiator (e.g., in some cases in solvent or solvent mixtures).

After the end of metering, the ε-caprolactone indicated is added and subsequently post-polymerized for a further 2 hours until a conversion of at least 95% has been reached.

The copolymers are diluted in suitable solvents or solvent mixtures.

The following copolymers are prepared. The precise batches in terms of parts by weight, reaction conditions and product characteristics can be taken from the tables below.

TABLE 3

Preparation and properties of the copolymer C

| Batch | Comparison | C |
|---|---|---|
| I Initial charge: | | |
| Glycidyl ester | 15.00 | 15.00 |
| ε-Caprolactone* | — | 1.02 |
| Hydroxyethyl methacrylate* | — | 1.16 |
| Temperature | 175° C. | 175° C. |
| II Monomers: | | |
| Acrylic acid | 5.73 | 5.73 |
| n-Butyl acrylate | 0.10 | 0.10 |
| Hydroxyethyl methacrylate | 10.87 | 9.71 |
| Methyl methacrylate | 30.44 | 30.44 |
| Styrene | 28.78 | 28.78 |
| Initiator: | | |
| Di-tert-amyl peroxide | 1.50 | 1.50 |
| Polymerization temperature | 175° C. | 175° C. |
| Course of polymerization | Reflux: strongly increasing | slight reflux |
| III Subsequent addition: | | |
| ε-Caprolactone | 9.08 | 8.06 |
| Process safety | deficient | assured |
| SC (%) after polymerization | batch | 98.2 |
| SC (%) sf. (in butyl acetate) | discarded | 70.1 |
| Acid number (mg KOH/g SR) | | 12.5 |
| hydroxyl number (mg KOH/g SR) | | 89.0 |
| | | 2410 |
| Viscosity (mPas), 23° C. (sf) | | 58 |
| Viscosity (mPas), 23° C. (50% strength in BuAc) | | |
| GPC (PS calibration) | | |
| Mw (g/mol) | | 5100 |
| Mn (g/mol) | | 2120 |
| U = Mw/Mn | | 2.4 |
| Hazen color number | | 24 |
| Appearance | | transparent |

SC: solids content
SR: solid resin

TABLE 3-continued

Preparation and properties of the copolymer C

| Batch | Comparison | C |
|---|---|---| sf: supply form
*Pre-reaction: formation of the polyesterol monomethacrylate
GPC: $M_w$, $M_n$ average molar mass (weight average, number average), Millipore ® Waters Chromatography System 860
Pump: Waters Model 590, RI detector: Waters Model 410
Column packing: Waters Ultrastyragel 1 × 1000 Å + 1 × 500 Å + 1 × 100 Å (Ångström)
Solvent: tetrahydrofuran at 40° C.
Flow rate: 1 ml/min, concentration: 1% strength based on solids content
Calibration: polystyrene (from PSS, Mainz)
Determination of characteristics: acid number, hydroxyl number and viscosity (for standards see "Analytische Bestimmungsmethoden" [Analytical determination methods] (brochure: Kunstharze Hoechst AG, 1982 edition))
Hazen color number in accordance with DIN 53 995

Result:

The copolymer C according to the invention can be prepared despite high polymerization temperature and very high content of methyl methacrylate.

The functional copolymer has low molar masses ($M_w$ less than 10,000 g/mol).

II.) Preparation of the coating material

In order to prepare the curable coating compositions according to the invention, the components—comprising a copolymer according to the invention or a mixture of two or more copolymers according to the invention with the auxiliaries and additives, solvents and crosslinking agents in the mixing ratio described (Tables 4, 5 and 6)—are mixed and are adjusted using further diluent to the spray viscosity of about 20 or 21 seconds with the flow cup (DIN 53 211, 4 mm, 23° C.). For components of low viscosity this can be carried out in bulk, with heating to higher temperatures being carried out if desired. Products of higher viscosity are dissolved or dispersed, prior to mixing, in the diluents mentioned, unless the curable mixtures are to be employed as a powder coating.

In the case of pigmented systems, a pigment paste is first of all produced in a dispersion step from the corresponding pigments together with the copolymer according to the invention or a mixture of two or more copolymers according to the invention, if appropriate with the addition of a suitable, specific grinding resin, in a dispersion apparatus of suitable construction. This pigment paste is thus mixed with the addition of further binder based on the components or on a mixture thereof, or else a different resin which is compatible with the other components of the coating system, and is made up with the addition of further diluent or additives which are typical for coating materials.

The pot life and the properties of the resulting films depend in this context on the process conditions, i.e., on the nature and quantity of the starting materials, metering of the catalysts, temperature regime, etc.; curing can be carried out discontinuously or continuously, for example, by means of an automatic coating apparatus.

a) Preparation of a clearcoat

The novel high-solids clearcoats are prepared in accordance with the formulation shown in Table 4.

TABLE 4

Preparation of the high-solids clearcoats

|  | AV | Copoly-mer A | Copoly-mer B |
|---|---|---|---|
| Appearance | transparent | transparent | transparent |
| SC (%) | 60 | 69.7 | 69.9 |
| OH number (mg KOH/g)/OH content (%) | 852/6 | 80/2.4 | 80.5/2.4 |
| Visc. 50% strength solution (mPa s) | — | 65 | 63 |
| Binder (sf.) | 82 | 82 | 82 |
| Tinuvin ® 292 | 0.5 | 0.5 | 0.5 |
| Tinuvin ® 1130 | 1.5 | 1.5 | 1.5 |
| Si oil LO 50%, 10% strength | 1 | 1 | 1 |
| Solvesso ® 100 | 1.5 | 1.5 | 1.5 |
| Xylene | 2.5 | 2.5 | 2.5 |
| BuAc | 11 | 11 | 11 |
| Desmodur ® N 3390 | 18.7 | 17.6 | 17.7 |
| DIN cup, 4 mm (DIN 53 211) | DIN-4 | DIN-4 | DIN-4 |
| Flow time (s) | 21 | 21 | 21 |
| Coating designation | LA | A | B |

Tinuvin ® 292 "HALS" (Ciba Geigy, Basle)
Tinuvin ® 1130 UV absorber (Ciba Geigy, Basle)
SI oil LO 50% leveling agent silicone oil (Wacker Chemie GmbH, Burghausen)
Desmodur ® N 3390 isocyanurate-containing polyisocyanate (Bayer AG, Leverkusen)
BuAc butyl acetate
AV comparison binder with high styrene content (>50%)

b) Preparation of pigmented topcoats
b1) Preparation of the white topcoats (copolymers A/B)

The white topcoats are prepared in accordance with the formulation shown in Table 5 (the figures are in each case parts per 100 parts of the mixture). The additives and the binder are milled in the solvent mixture in a bead mill to a particle size of less than 10 µm.

TABLE 5

Preparation of the white topcoats

| Binder Components | AV | A | B |
|---|---|---|---|
| Copolymers | 51.0 | 51.0 | 51.0 |
| Solids content of the solution (%) | 60 | 69.7 | 69.9 |
| Solids (parts) | 30.6 | 35.5 | 35.7 |
| Solvent mixture* (1:3:1) | 13.65 | 9.05 | 8.95 |
| Additol ® XL 250 (wetting agent) | 1.6 | 1.6 | 1.6 |
| Tinuvin ® 292 | 0.45 | 0.45 | 0.45 |
| Tinuvin ® 1130 | 0.9 | 0.9 | 0.9 |
| Kronos Titan ® 2310 | 32.0 | 36.6 | 36.7 |
| Additol ® XL 125 (leveling agent) | 0.4 | 0.4 | 0.4 |
| Flow time (DIN 53211)+ in s | 80 | 80 | 80 |
| Desmodur ® N 75 (75% strength solution, parts) | 12.4 | 13.6 | 13.6 |
| Solids (parts) | 9.3 | 10.2 | 10.2 |
| Solids content in %# | 55 | 65.5 | 65 |
| Binder:pigment:solids ratio | 1:0.8 | 1:0.8 | 1:0.8 |

*methoxypropyl acetate:BuAc:Solvesso ® 100
+DIN cup with 4 mm flow aperture, 23° C.
diluted with about 12% solvent mixture to spray viscosity of 20 s
Solvesso ® 100 (Deutsche Exxon Chemical GmbH, Cologne)
Additol ® (Hoechst, Frankfurt/Main)
Kronos Titan ® (Kronos Titan GmbH, Leverkusen)
Desmodur ® N 75 polyisocyanate (Bayer AG, Leverkusen)
AV: comparison binder with high styrene content (>50%)
OH number: about 85 mg KOH/g of solid resin b2) Preparation of the white topcoats (copolymer C)

The white topcoats are prepared in accordance with the formulation shown in Table 6 (the figures are in each case parts per 100 parts of the mixture). The additives and the binder are milled in the solvent mixture in a bead mill to a particle size of less than 10 µm.

TABLE 6

Preparation of the white topcoats

| Binder Components | AV | C |
|---|---|---|
| Copolymers | 51.0 | 51.0 |
| Solids content of the solution (%) | 60 | 70.1 |
| Solids (parts) | 30.6 | 35.8 |
| Solvent mixture* (1:3:1) | 13.65 | 8.90 |
| Additol ® XL 250 (wetting agent) | 1.6 | 1.6 |
| Tinuvin ® 292 | 0.45 | 0.45 |
| Tinuvin ® 1130 | 0.9 | 0.9 |
| Kronos Titan ® 2310 | 32.0 | 37.8 |
| Additol ® XL 125 (leveling agent) | 0.4 | 0.4 |
| Flow time (DIN 53211)+ in s | 80 | 80 |
| Desmodur ® N 75 (75% strength solution, parts) | 12.4 | 15.2 |
| Solids (parts) | 9.3 | 11.4 |
| solids content in %# | 55 | 64.8 |
| Binder:pigment:solids ratio | 1:0.8 | 1:0.8 |

*methoxypropyl acetate:BuAc:Solvesso ® 100
+DIN cup with 4 mm flow aperture, 23° C.
diluted with about 12% solvent mixture to spray viscosity of 20 s
Solvesso ® 100 (Deutsche Exxon Chemical GmbH, Cologne)
Additol ® (Hoechst, Frankfurt/Main)
Kronos Titan ® (Kronos Titan GmbH, Leverkusen)
Desmodur ® N 75 polyisocyanate (Bayer AG, Leverkusen)
AV: comparison binder with high styrene content (>50%)
OH number: about 85 mg KOH/g of solid resin The preparation of topcoats having a paint solids content of up to 70% can be achieved without problems using the copolymers according to the invention by altering the pigment:binder ratio.

III.) Performance testing a) Clearcoats

The coating systems prepared as in II a) are applied to cleaned glass panels using 100 µm doctor blades and are tested under the conditions of air drying and forced drying (45 minutes at 60° C.).

TABLE 7 a

Performance testing of high-solids clearcoats

| Coating designation | LA | A | B |
|---|---|---|---|
| Appearance | transparent | transparent | transparent |
| Initial/pot life | >8 h | >8 h | >8 h |
| Dust-dry time | 10' | 12' | 9' |
| Tack-free drying | 75' | 105' | 65' |
| SC-1 h 125° C. | 50 | 59.5 | 59 |
| Pendulum hardness in s after |  |  |  |
| 24 h | 85 | 24 | 38 |
| 2 d | 130 | 66 | 99 |
| 6 d | 203 | 120 | 142 |
| 10 d | 211 | 198 | 201 |
| Resistance to premium-grade gasoline after 10 d in min. | 8 | >30 | >30 |
| Pendulum hardness in s after 45' 60° C. drying |  |  |  |
| 24 h | 154 | 82 | 92 |
| 2 d | 185 | 133 | 152 |
| 5 d | 203 | 205 | 198 |
| 45' 60° C. drying | 5 | >30 | >25 |
| Resistance to premium-grade gasoline after 5 d in min. |  |  |  |

LA: comparison coating material containing binder with high styrene content >50%

TABLE 7 b

Short-term weathering: Atlas UV/CON (Chicago, Illinois, USA*)

| Coating Designation | LAV | A | B |
|---|---|---|---|
| UV/CON | | | |
| 250 h | tinged with yellow | colorless | colorless |
| 500 h | yellowish | " | " |
| 1000 h | " | " | " |
| 1500 h | " | " | " |
| Cycles: | | | |
| 8 h UV 69° C. | | | |
| 4 h condensate 49° C. | | | |
| (dark phase) | | | |

*Agent: Brabender(Duisburg)

Summary:

The coating compositions according to the invention, uncatalyzed in clearcoats formulated as in practice, have very high solids contents of coating material, very high resistance properties, and outstanding weathering resistance.

b) White topcoats (pigmented)

The coating systems prepared as in IIb) are applied to cleaned glass panels using 100 μm doctor blades and tested under air drying.

TABLE 8

Performance testing of the topcoats on glass

| Coating designation | AV | A | B | C |
|---|---|---|---|---|
| Pot life | >8 h | >8 h | >8 h | >5.5 h |
| Dust-dry time | 12' | 15' | 12' | 18' |
| Tack-free drying | 120' | 145' | 100' | 135' |
| SC-1 h 125° C. | 55 | 65.5 | 65 | 64.8 |
| Pendulum hardness in s after | | | | |
| 24 h | 67 | 25 | 45 | 39 |
| 2 d | 118 | 82 | 99 | 88 |
| 5 d | 161 | 130 | 153 | 105 |
| 10 d | 195 | 165 | 181 | 147 |
| Resistance to premium-grade gasoline after 10 d in min. | >30 | >30 | >30 | >15 |
| Reflectometer value | | | | |
| 20° | 88 | 86 | 89 | 93 |
| 60° | 93 | 90 | 94 | 96 |
| Dry film thickness 38–43 μm | | | | |

Summary:

The coating compositions according to the invention, in white topcoats formulated as in practice, have high pigmentability, very high solids contents of coating material, very high resistance properties, and outstanding gloss.

The coating systems prepared in II are applied to phosphatized steel panels by 1.5 spray passes and are tested after 10 d. The results are summarized in Table 9:

TABLE 9

Performance testing of the topcoats on steel

| Coating designation | AV | A | B | C |
|---|---|---|---|---|
| Erichsen indentation in mm | 9.0 | 9.1 | 8.7 | 9.2 |
| Dry-film thickness in μm | 40 | 43 | 43 | 45 |
| Adhesion/crosshatch GT | 0–1 | 0 | 0 | 1–2 |

TABLE 9-continued

Performance testing of the topcoats on steel

| Coating designation | AV | A | B | C |
|---|---|---|---|---|
| Reflectometer value | | | | |
| 20° | 88 | 88 | 89 | 92 |
| 60° | 93 | 93 | 94 | 96 |

TABLE 10

Results of the Xenon test 1200 (60°)
Accelerated weathering based on DIN 53387-B
(3 min spraying of water, 17 min drying)

| Relative gloss retention % | AV | A | B | C |
|---|---|---|---|---|
| Exposure in h    0 | 100 | 100 | 100 | 100 |
| 500 | 98.9 | 99.1 | 99.5 | 97.5 |
| 1000 | 96.7 | 98.7 | 99.1 | 94.2 |
| 1500 | 95.6 | 97.8 | 99.0 | 90.7 |
| 2000 | 94.4 | 97.5 | 98.9 | n.m. | n.m. = not measured

Summary:

The coating compositions according to the invention, in white topcoats formulated as in practice, have outstanding surface quality and adhesion on steel panels and have an extremely high gloss retention in the Xenon test (short-term weathering).

The coating material C is additionally distinguished by outstanding spray-mist takeup during application.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for the preparation of a functional polymer of low molar mass, which comprises initially charging a first quantity M1 of a mixture comprising at least one component selected from olefinically unsaturated monomers B and compounds A which are not themselves copolymerizable but which are able to react with at least one of the monomers B to form a copolymerizable addition compound, metering in prior to or during polymerization a second quantity M2 of a mixture whose composition can be identical to or different from that of the first mixture M1 and which comprises at least one component selected from olefinically unsaturated monomers B and compounds A, initiating polymerization by use of a polymerization initiator and optionally a chain transfer agent, conducting polymerization in the presence of an oligomer or polymer C, wherein the oligomer or polymer C is either formed in situ from one or more of A and B or is dissolved in at least one of the quantities M1 and M2, and wherein at least one of M1 and M2 comprises a monomer B.

2. A process as claimed in claim 1, wherein one or more compounds A are added after the end of polymerization.

3. A process as claimed in claim 1, wherein one or more polymerization initiators are metered in during the polymerization.

4. A process as claimed in claim 1, wherein only compounds A are present in the mixture M1.

5. A process as claimed in claim 1, wherein only compounds A and oligomer or polymer C are present in the mixture M1.

6. A process as claimed in claim 1, wherein the polymer or oligomer C contains one or more functional groups selected from hydroxyl, carboxyl, or amino groups; or at least one olefinic double bonds.

7. A process as claimed in claim 1, wherein one or more solvents are added to the reaction mixture before, during, or after the polymerization.

8. A process as claimed in claim 1, wherein M1 or M2 comprises a mixture of monomers B that comprises one or more of the compounds B1 α,β-olefinically unsaturated carboxylic acids, B2 esters of aliphatic alcohols and α,β-olefinically unsaturated carboxylic acids, B3 esters of aliphatic diols or polyols having n hydroxyl groups per molecule and from 1 to n−1 mol/mol of α,β-olefinically unsaturated carboxylic acids, n being at least 2, B4 amides, N-substituted amides, or nitriles of α,β-olefinically unsaturated carboxylic acids, and B5 vinyl compounds selected from vinyl esters of aliphatic monocarboxylic acids having 1 to 20 carbon atoms, vinyl ketones, vinyl ethers, vinyl halides, aromatic vinyl compounds, and vinylidene halides, in which the mixture comprises at least one compound from each of groups B1 and B2 and compounds from groups B3, B4 and B5 can optionally be present.

9. A process as claimed in claim 8, wherein M1 or M2 comprises a component A that comprises one or more compounds which undergo addition or polyaddition with a compound according to B1 to form an ester or an amide.

10. A process as claimed in claim 8, wherein M1 or M2 comprises a component A that comprises one or more compounds which undergo addition or polyaddition with a compound according to B3 to form an ester.

11. A process as claimed in claim 1, wherein M1 or M2 comprises a component A selected from epoxy compounds, lactones, lactams, cyclic carbonates, maleates, cyclic anhydrides, cyclic acetals, and ketenes.

12. A process as claimed in claim 1, wherein M1 or M2 comprises a component A selected from glycidyl esters having 7 to 30 carbon atoms of aliphatic saturated monocarboxylic acids having a tertiary or quaternary α carbon atom.

13. A process as claimed in claim 1, wherein component C comprises an oligomer or polymer; each having on average at least one functional group or one polymerizable double bond per molecule, the functional group of component C being able to react with functional groups of the monomers B employed to form a chemical bond.

14. A process as claimed in claim 1, wherein component C comprises one or more compounds having functional groups, selected from C1 polyesters of aliphatic diols and aliphatic dicarboxylic acids and/or lactones, in which up to 5% of the carboxylic acids and/or of the diols can be replaced by polycarboxylic acids or, respectively, by polyols having in each case three or more functional groups, and up to 5% of the carboxylic acids can be olefinically unsaturated, C2 polyamides of aliphatic dicarboxylic acids, aliphatic diamines and/or lactams, in which up to 5% of the carboxylic acids and/or of the diamines can be replaced by polycarboxylic acids or, respectively, by polyamines having in each case three or more functional groups, and up to 5% of the carboxylic acids can be olefinically unsaturated, C3 polyethers of aliphatic diols which may optionally carry amino end groups, and polyethers which can be formed from glydicyl ethers of aromatic or aliphatic di- and/or polyhydroxy compounds, in which case up to 5% of the hydroxy compounds can be olefinically unsaturated, and C4 polymers which are obtained by copolymerization of compounds having one olefinic double bond and at least 2%, based on the mass of the monomers, of compounds having at least two olefinic double bonds, the functional groups being selected from one or more of hydroxyl, carboxyl, and amino groups, and olefinic double bonds.

15. A process as claimed in claim 1, wherein from 1 to 35% of component A and from 98.9 to 40% of component B and from 0.1 to 25% of component C are employed, based on the total mass of A, B, and C.

16. A process as claimed in claim 1, wherein either M1 or M2 includes a mixture of monomers B that comprises B1 from 1 to 50% of an α,β-olefinically unsaturated carboxylic acid, B2 from 5 to 99% of an ester of a aliphatic alcohol having 1 to 30 carbon atoms and an α,β-olefinically unsaturated carboxylic acid, B3 from 0 to 45% of an ester of an aliphatic diol or polyol having 2 to 30 carbon atoms and n hydroxyl groups per molecule and from 1 to n−1 mol/mol of an α,β-olefinically unsaturated carboxylic acid, n being at least 2, B4 from 0 to 45% of an amide, an N-substituted amide or a nitrile of an α,β-olefinically unsaturated carboxylic acid, and B5 from 0 to 45% of a vinyl compound selected from vinyl esters of aliphatic monocarboxylic acids having 1 to 20 carbon atoms, vinyl ketones, vinyl ethers, vinyl halides, styrene, vinyltoluene and vinylidene halides, the sum of the proportions by mass adding to give 100%.

17. A process as claimed in claim 16, wherein the monomers B1 are selected from an α,β-olefinically unsaturated monocarboxylic acid having 3 to 22 carbon atoms and an ester of n−1 mol of an aliphatic alcohol having 1 to 10 carbon atoms with 1 mol of an α,β-olefinically unsaturated n-basic polycarboxylic acid having 4 to 22 carbon atoms, n being at least two.

18. A process as claimed in claim 16, wherein the monomers B2 are selected from an ester of an aliphatic alcohol having 1 to 30 carbon atoms and an α,β-olefinically unsaturated carboxylic acid having 3 to 22 carbon atoms.

19. A process as claimed in claim 16, wherein the monomers B3 are used and are selected from an ester of an aliphatic diol or polyol having 2 to 30 carbon atoms and n hydroxyl groups per molecule and from 1 to n−1 mol/mol of an α,β-olefinically unsaturated carboxylic acid having 3 to 22 carbon atoms, n being at least 2.

20. A process as claimed in claim 16, wherein the monomers B4 are used and are selected from an amide, an N-substituted amide and a nitrile of α,β-olefinically unsaturated carboxylic acids having 3 to 22 carbon atoms.

21. A process as claimed in claim 16 wherein the monomers B5 are used and are selected from a vinyl ester of an aliphatic monocarboxylic acid having 1 to 20 carbon atoms, a vinyl ketone and a vinyl ether each having 4 to 20 carbon atoms, vinyl chloride, styrene, vinyltoluene, vinylnaphthalene and vinylidene chloride.

22. A process as claimed in claim 16, wherein the monomers B1 are selected from acrylic acid, methacrylic acid, crotonic acid, isocrotonic acid, vinylacetic acid, maleic acid, and fumaric acid, and the monoesters thereof with aliphatic alcohols having 1 to 10 carbon atoms.

23. A process as claimed in claim 16, wherein the monomers B2 are selected from acrylic and methacrylic esters of aliphatic alcohols having 1 to 10 carbon atoms.

24. A process as claimed in claim 16, wherein the monomers B3 are used and are selected from hydroxyalkyl acrylates and hydroxyalkyl methacrylates each having 2 to 30 carbon atoms in the alkylene radical.

25. A process as claimed in claim 16, wherein the monomers B4 are used and are selected from acrylamide, methacrylamide, N-alkyl- and N,N-dialkyl(meth) acrylamide having 1 to 6 carbon atoms in the alkyl radical, and methacrylonitrile and acrylonitrile.

26. A process as claimed in claim 1, wherein the produced functional polymer has an OH number of from 40 to 250 mg of KOH/g, a solution viscosity from 15 to 2000 mPa s (50% strength, 23° C.), a weight-average molar mass ($M_w$) of less than 10,000 g/mol; and a proportion by mass of methyl methacrylate of more than 15%.

27. A process as claimed in claim 1, wherein the produced functional polymer has a weight average molecular weight of from 300 to 10,000 g/mol.

28. A process as claimed in claim 1, wherein at least one of M1 and M2 comprises a compound A.

29. A process as claimed in claim 1, wherein M1 comprises a compound A and a monomer B.

\* \* \* \* \*